(12) United States Patent
Moy et al.

(10) Patent No.: US 8,397,920 B2
(45) Date of Patent: Mar. 19, 2013

(54) PLEATED FILTER ELEMENT WITH TAPERING BEND LINES

(75) Inventors: Jerald J. Moy, Oregon, WI (US); Eric A. Janikowski, Jefferson, WI (US); Kenneth M. Tofsland, Stoughton, WI (US)

(73) Assignee: Cummins Filtration IP Inc., Minneapolis, MN (US)

( * ) Notice: Subject to any disclaimer, the term of this patent is extended or adjusted under 35 U.S.C. 154(b) by 0 days.

(21) Appl. No.: 13/273,551

(22) Filed: Oct. 14, 2011

(65) Prior Publication Data

US 2012/0118814 A1 May 17, 2012

Related U.S. Application Data

(63) Continuation of application No. PCT/US2011/054924, filed on Oct. 5, 2011, and a continuation-in-part of application No. 13/240,088, filed on Sep. 22, 2011, now abandoned.

(60) Provisional application No. 61/414,235, filed on Nov. 16, 2010.

(51) Int. Cl.
*B01D 29/07* (2006.01)
*B01D 29/00* (2006.01)

(52) U.S. Cl. .................................... 210/493.1
(58) Field of Classification Search ............ 210/493.1
See application file for complete search history.

(56) References Cited

U.S. PATENT DOCUMENTS

| | | | |
|---|---|---|---|
| 3,293,833 A | 12/1966 | Barany | |
| 3,410,062 A | 11/1968 | Hart | |
| 3,921,432 A * | 11/1975 | Rivers | 72/362 |
| 4,925,561 A * | 5/1990 | Ishii et al. | 210/493.3 |
| 5,558,689 A | 9/1996 | Yanagihara et al. | |
| 5,814,117 A * | 9/1998 | Mochida | 55/385.3 |
| 6,000,685 A | 12/1999 | Groten et al. | |
| 6,238,561 B1 | 5/2001 | Liu et al. | |
| 6,273,938 B1 | 8/2001 | Fanselow et al. | |
| 6,391,076 B1 | 5/2002 | Jaroszczyk et al. | |
| 6,544,310 B2 | 4/2003 | Badeau et al. | |
| 7,314,558 B1 | 1/2008 | Jaroszczyk et al. | |
| 7,323,105 B1 | 1/2008 | Janikowski et al. | |
| 7,323,106 B2 | 1/2008 | Jaroszczyk et al. | |
| 7,488,365 B2 * | 2/2009 | Golden et al. | 55/521 |
| 7,588,619 B2 | 9/2009 | Chilton et al. | |
| 7,648,546 B2 | 1/2010 | Haberkamp et al. | |
| 7,879,125 B2 | 2/2011 | Haberkamp et al. | |
| 2006/0272305 A1 | 12/2006 | Morgan | |
| 2008/0011673 A1 | 1/2008 | Janikowski et al. | |
| 2011/0186504 A1 | 8/2011 | Rocklitz | |

* cited by examiner

*Primary Examiner* — Nam Nguyen
*Assistant Examiner* — Madeline Gonzalez
(74) *Attorney, Agent, or Firm* — Andrus, Sceales, Starke & Sawall, LLP

(57) ABSTRACT

A pleated filter element extends axially between an upstream inlet and a downstream outlet along a plurality of axially extending bend lines forming axial flow channels. The bend lines taper in a transverse direction and define a plurality of axially elongated tetrahedron channels facing oppositely to each other.

23 Claims, 11 Drawing Sheets

PLEATED FILTER ELEMENT WITH TAPERING BEND LINES

CROSS-REFERENCE TO RELATED APPLICATIONS

This application is a continuation-in-part of U.S. patent application Ser. No. 13/240,088, filed Sep. 22, 2011, incorporated herein by reference. This application is a continuation of International Patent Application No. PCT/US2011/054924, filed Oct. 5, 2011, incorporated herein by reference. This application claims the benefit of and priority from Provisional U.S. Patent Application No. 61/414,235, filed Nov. 16, 2010, incorporated herein by reference.

BACKGROUND AND SUMMARY

The invention relates to pleated filter elements.

Pleated filter elements are known in the prior art. Filter media is pleated along a plurality of bend lines extending axially along an axial direction between an upstream inlet and a downstream outlet. A plurality of wall segments extend in serpentine manner between the bend lines and define axial flow channels therebetween. The channels have a height along a transverse direction which is perpendicular to the axial direction. The channels have a lateral width along a lateral direction which is perpendicular to the axial direction and perpendicular to the transverse direction. Fluid is filtered by passing through the filter media wall segments from one channel to another.

The present disclosure arose during continuing development efforts in the above technology.

DETAILED DESCRIPTION

Figure 1:
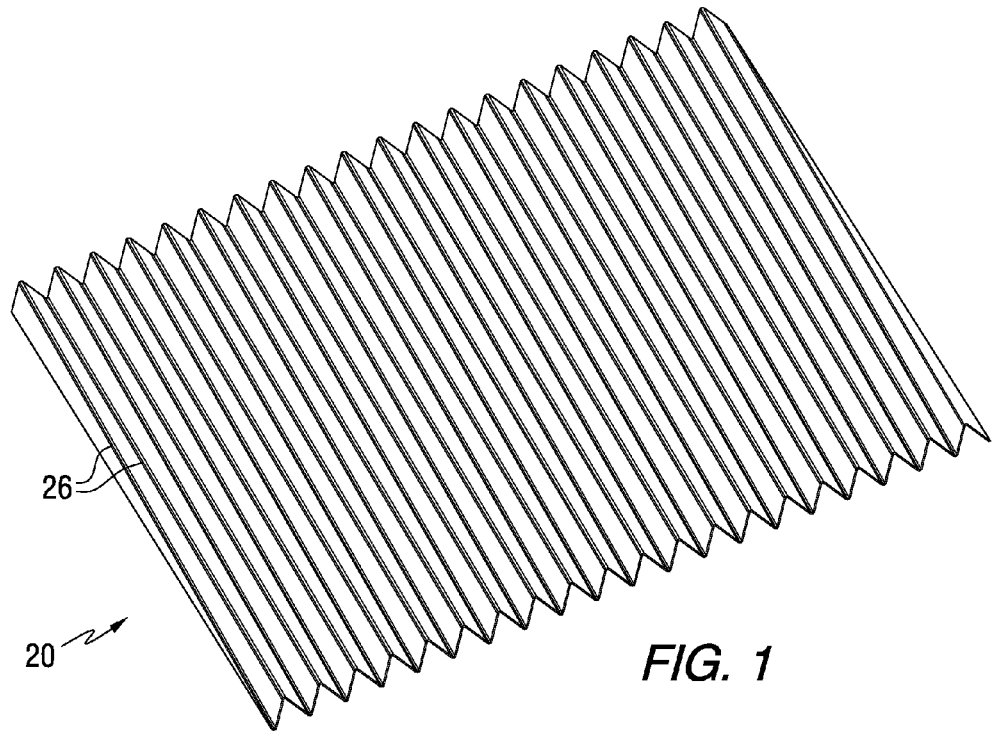
FIG. 1 is a perspective view of a pleated filter element in accordance with the disclosure.

FIGS. 1-4 show a filter element 20 having an upstream inlet 22 receiving incoming dirty fluid as shown at arrows 23, and having a downstream outlet 24 discharging clean filtered fluid as shown at arrows 25. The filter element is composed of filter media and is pleated along a plurality of bend lines 26. The bend lines extend axially along an axial direction 28, FIGS. 2-4, and include a first set of bend lines 30 extending from upstream inlet 22 towards downstream outlet 24, and a second set of bend lines 32 extending from downstream outlet 24 axially towards upstream inlet 22. The filter element has a plurality of filter media wall segments 34 extending in serpentine manner between the bend lines. The wall segments extend axially and define axial flow channels 36 therebetween. The channels have a height 38 along a transverse direction 40, which transverse direction 40 is perpendicular to axial direction 28, FIG. 2. The channels have a lateral width 42 along a lateral direction 44, which lateral direction 44 is perpendicular to axial direction 28 and perpendicular to transverse direction 40. At least some of the noted bend lines taper in the noted transverse direction as they extend axially in the noted axial direction, to be described.

Figure 2:
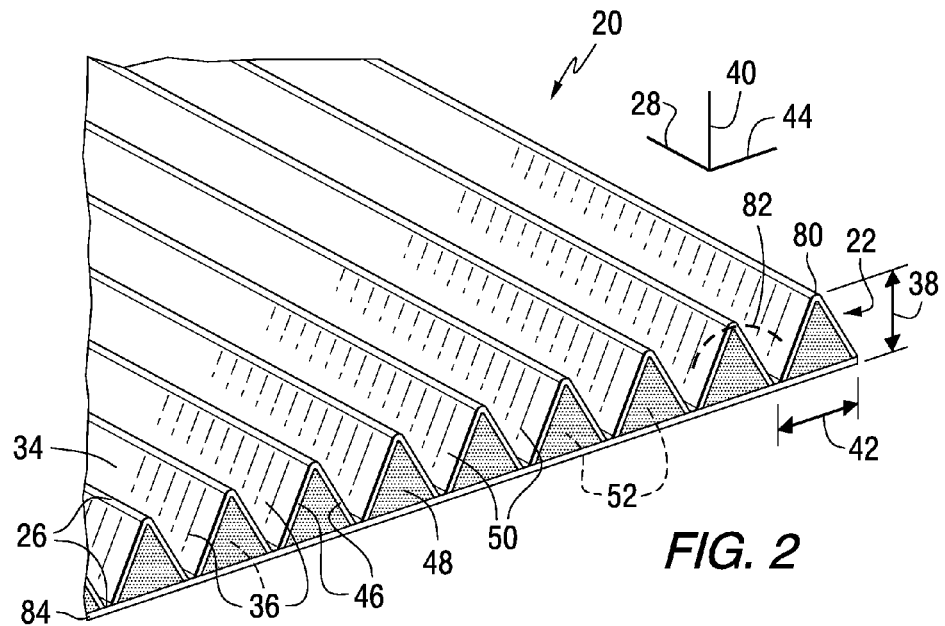
FIG. 2 is an enlarged perspective view of a pleated filter element in accordance with the disclosure.
Figure 3:
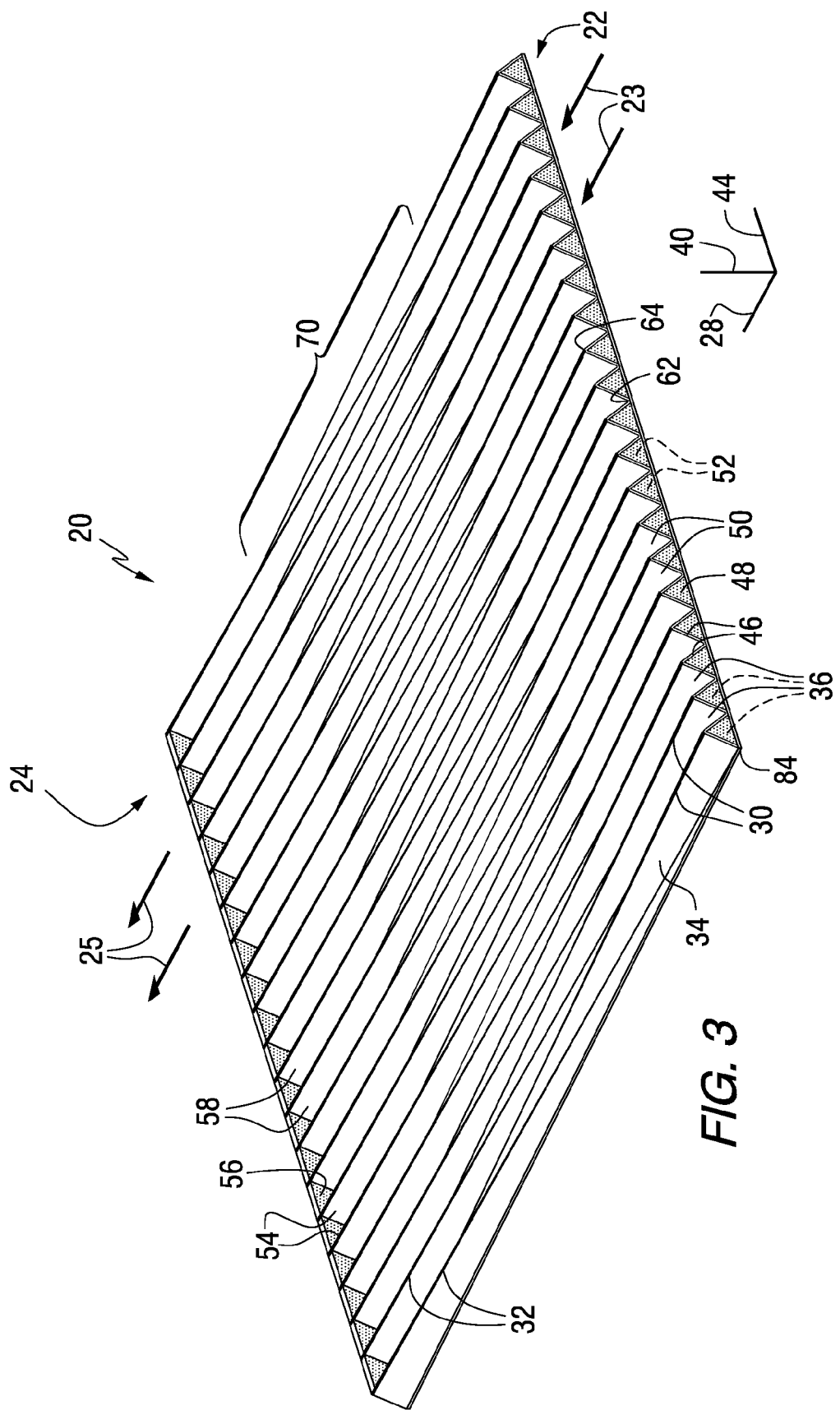
FIG. 3 is like FIG. 1 and shows further construction of the pleated filter element from the inlet end.
Figure 4:
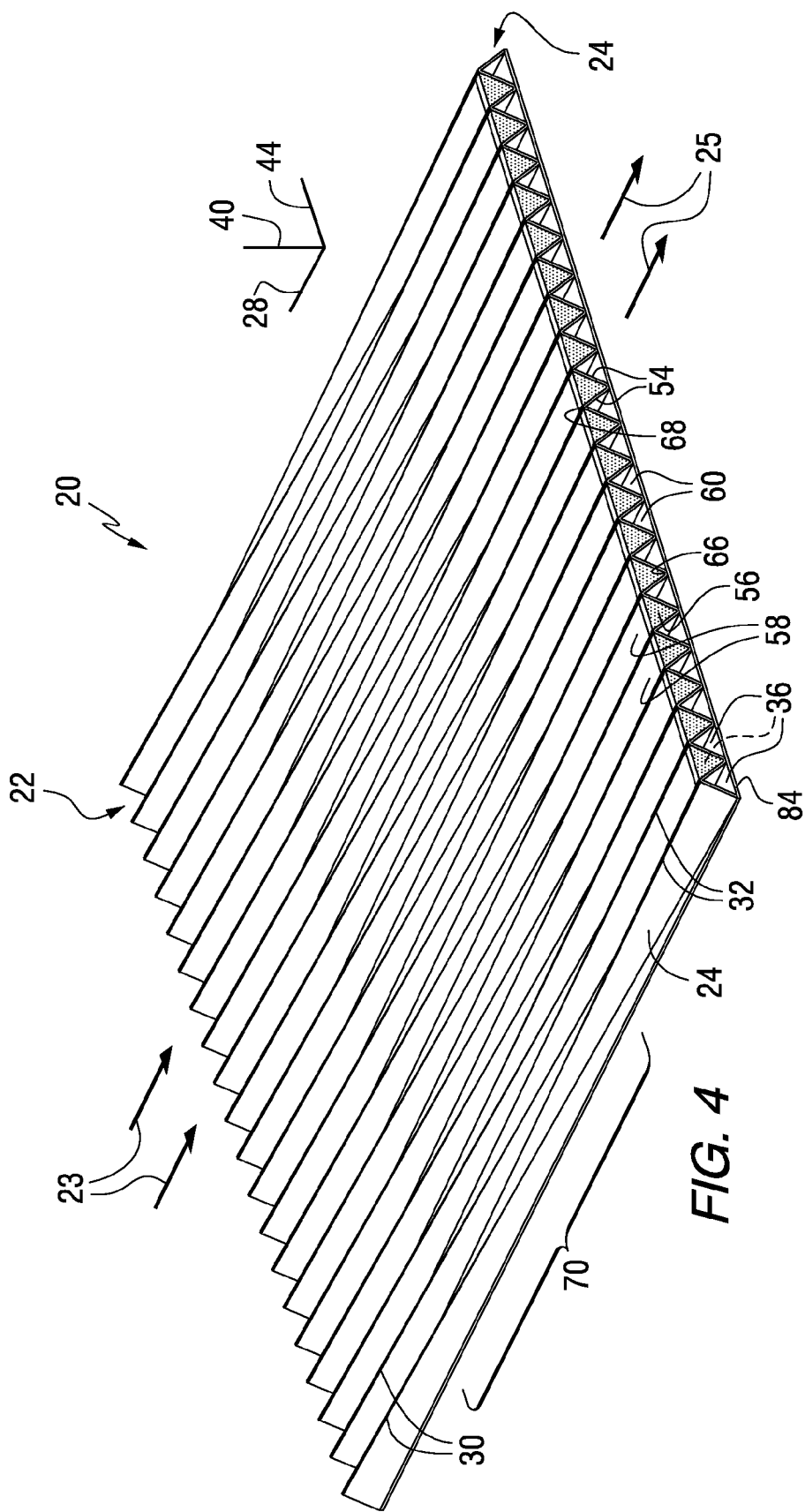
FIG. 4 is like FIG. 1 and shows further construction of the pleated filter element from the outlet end.

The wall segments include a first set of wall segments 46, FIGS. 2, 3, alternately sealed to each other at upstream inlet 22, e.g. by adhesive 48 or the like, to define a first set of channels 50 having open upstream ends, and a second set of channels 52 interdigitated with the first set of channels and having closed upstream ends. The wall segments include a second set of wall segments 54, FIGS. 3, 4, alternately sealed to each other at downstream outlet 24, e.g. by adhesive 56 or the like, to define a third set of channels 58 having closed downstream ends, and a fourth set of channels 60, FIG. 4, having open downstream ends. The first set of bend lines 30 includes a first subset of bend lines 62 defining the first set of channels 50, and a second subset of bend lines 64 defining the second set of channels 52. The second subset of bend lines 64 taper in transverse direction 40 as they extend from upstream inlet 22 axially towards downstream outlet 24, FIGS. 5-7. The second set of bend lines 32 includes a third subset of bend lines 66 defining the third set of channels 58, and a fourth subset of bend lines 68 defining the fourth set of channels 60. The fourth subset of bend lines 68 taper in the transverse direction 40 as they extend from downstream outlet 24 axially towards upstream inlet 22, FIGS. 5-7. The second set of channels 52 have a decreasing transverse channel height 38 along transverse direction 40 as the second set of channels 52 extend axially along axial direction 28 towards outlet 24. The tapering of the second subset of bend lines 64 in the transverse direction 40 provides the decreasing transverse channel height 38 of the second set of channels 52. The fourth set of channels 60 have a decreasing transverse channel height along transverse direction 40 as the fourth set of channels 60 extend axially along axial direction 28 towards upstream inlet 22. The tapering of the fourth subset of bend lines 68 in the transverse direction 40 provides the decreasing transverse channel height 38 of the fourth set of channels 60.

Incoming dirty fluid 23 to be filtered flows along axial direction 28 into open channels 50 at upstream inlet 22 and passes laterally and/or transversely through the filter media wall segments of the pleated filter element and then flows axially along axial direction 28 as clean filtered fluid 25 through open channels 60 at downstream outlet 24. Second subset of bend lines 64 provides lateral cross-flow thereacross along lateral direction 44 between respective channels downstream of upstream inlet 22. Fourth subset of bend lines 68 provides lateral cross-flow thereacross along lateral direction 44 between respective channels upstream of downstream outlet 24. Second and fourth subsets of bend lines 64 and 68 have axially overlapping sections 70, and the noted lateral cross-flow is provided at least at axially overlapping sections 70.

Figure 5:
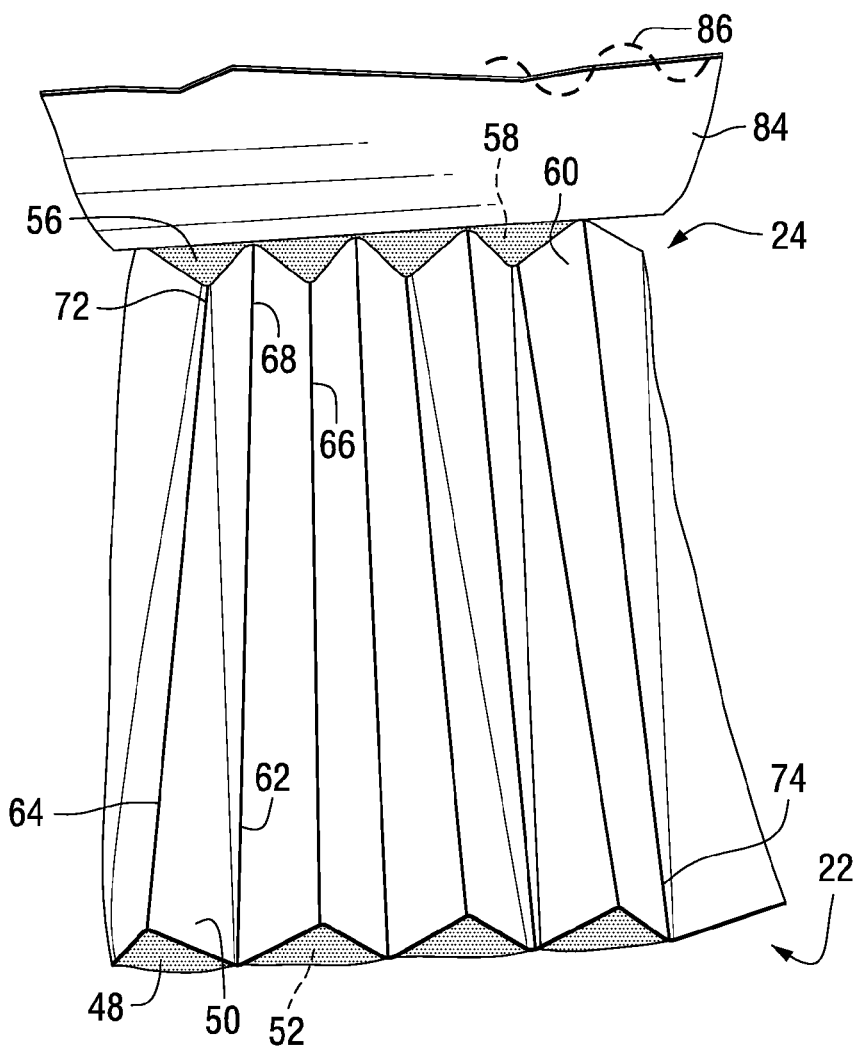
FIG. 5 is an exploded perspective view showing a portion of a pleated filter element in accordance with the disclosure.
Figure 6:
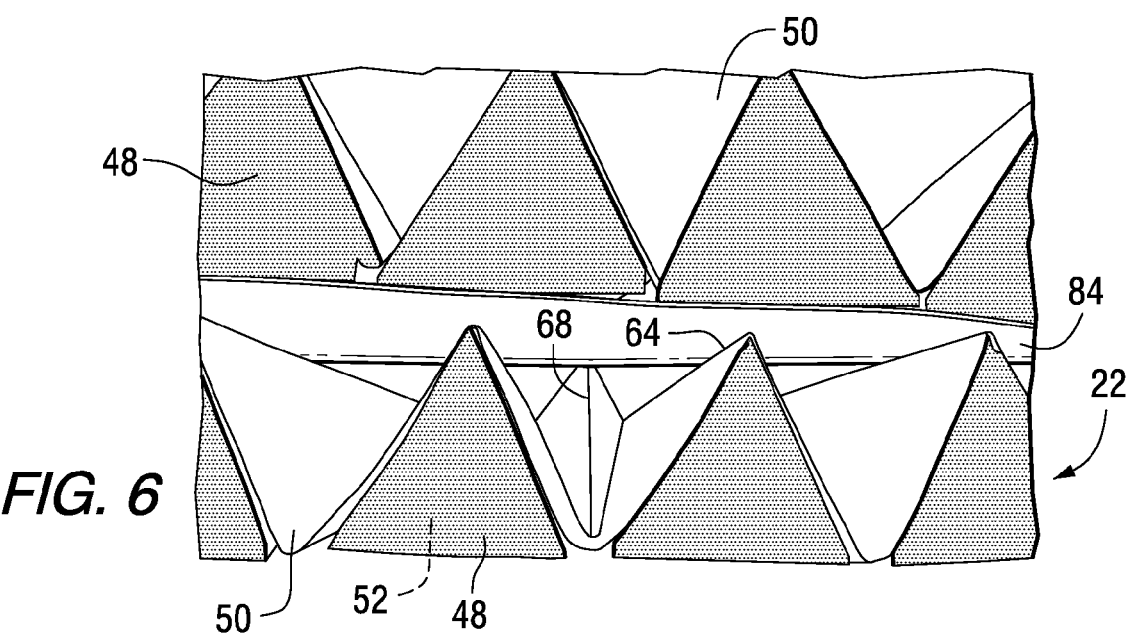
FIG. 6 is an enlarged perspective view showing a portion of a pleated filter element in accordance with the disclosure.
Figure 7:
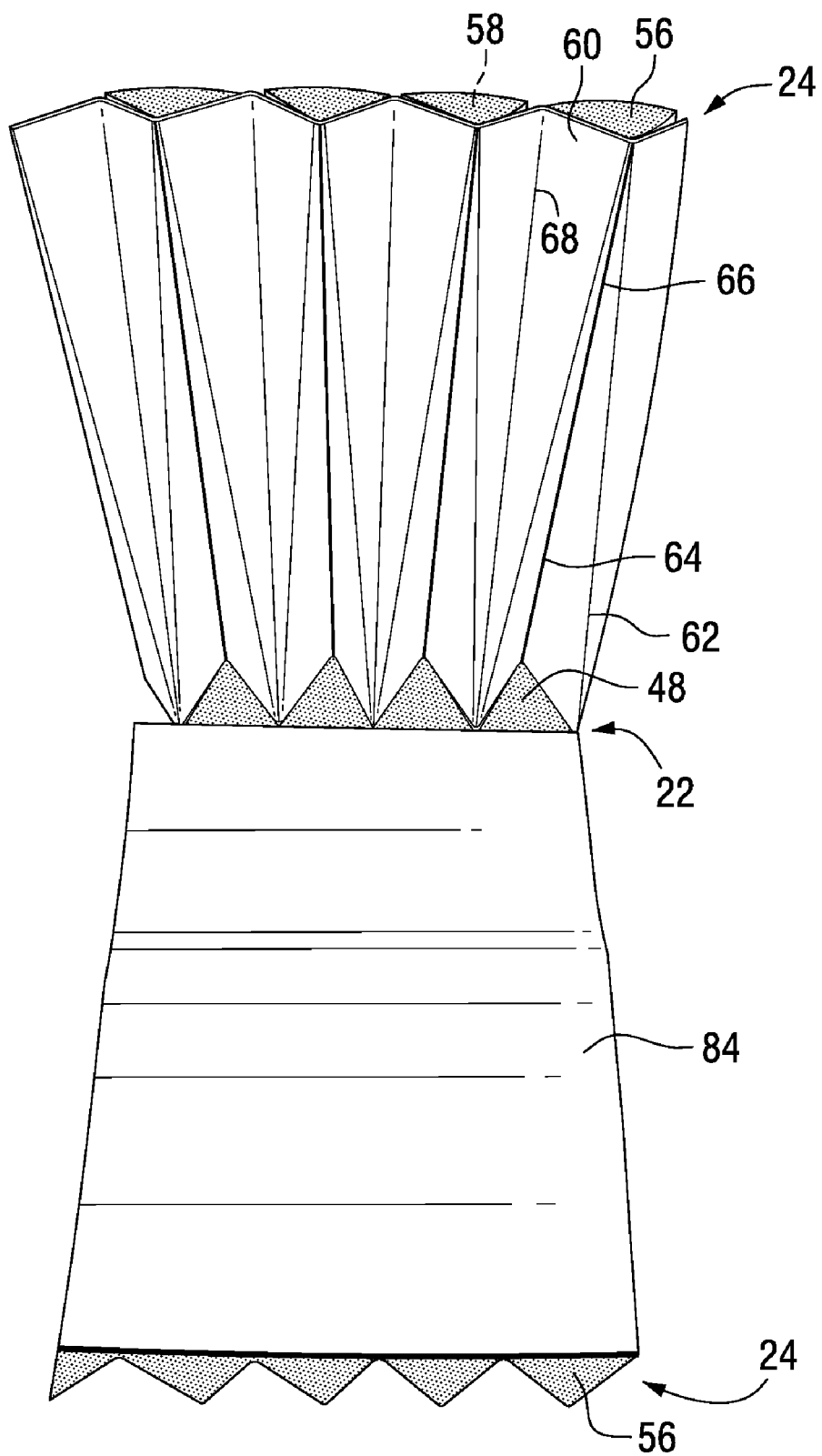
FIG. 7 is like FIG. 5 and is a view from the opposite end.

The second subset of bend lines 64 taper to respective termination points 72, FIGS. 5-7, providing at such termination points the minimum transverse channel height 38 of the second set of channels 52. The fourth subset of bend lines 68 taper to respective termination points 74 providing at such termination points the minimum transverse channel height 38 of the fourth set of channels 60. Termination points 72 of second subset of bend lines 64 are axially downstream of termination points 74 of fourth subset of bend lines 68. This provides the noted axially overlapping sections 70. Termination points 72 of second subset of bend lines 64 are at downstream outlet 24 in one embodiment, and in other embodiments are axially upstream of downstream outlet 24. Termination points 74 of fourth subset of bend lines 68 are at upstream inlet 22 in one embodiment, and in other embodiments are axially downstream of upstream inlet 22.

First set of wall segments 46 alternately sealed to each other at adhesive 48 at upstream inlet 22 define a first set of tetrahedron channels 50 having open upstream ends, and a second set of tetrahedron channels 52 interdigitated with the first set of tetrahedron channels 50 and having closed upstream ends. Second set of wall segments 54 alternately sealed to each other at adhesive 56 at downstream outlet 24 define a third set of tetrahedron channels 58 having closed downstream ends, and a fourth set of tetrahedron channels 60 interdigitated with the third set of tetrahedron channels 58 and having open downstream ends. The first set of bend lines 30 includes the first subset of bend lines 62 defining the first set of tetrahedron channels 50, and the second subset of bend lines 64 defining the second set of tetrahedron channels 52. The second subset of bend lines 64 taper in the transverse direction 40 as they extend from upstream inlet 22 axially towards downstream outlet 24. The second set of bend lines 32 includes the third subset of bend lines 66 defining the third set of tetrahedron channels 58, and the fourth subset of bend lines 68 defining the fourth set of tetrahedron channels 60. The fourth subset of bend lines 68 taper in the transverse direction 40 as they extend from downstream outlet 24 axially towards upstream inlet 22.

First and second sets of tetrahedron channels 50 and 52, FIGS. 3-7, face oppositely to third and fourth sets of tetrahedron channels 58 and 60. Each of the tetrahedron channels 50, 52, 58, 60 is elongated in the axial direction 28. Each of the tetrahedron channels has a cross-sectional area along a cross-sectional plane defined by the transverse and lateral directions 40 and 44. The cross-sectional areas of the first and second sets of tetrahedron channels 50 and 52 decrease as the first and second sets of tetrahedron channels 50 and 52 extend along axial direction 28 from upstream inlet 22 toward downstream outlet 24. The cross-sectional areas of third and fourth sets of tetrahedron channels 58 and 60 decrease as the third and fourth sets of tetrahedron channels 58 and 60 extend along axial direction 28 from downstream outlet 24 toward upstream inlet 22. In one embodiment, bend lines 26 are bent at a sharp pointed angle, as shown at 80, FIG. 2. In other embodiments, the bend lines are rounded along a given radius, as shown in dashed line at 82, FIG. 2.

Figure 8:
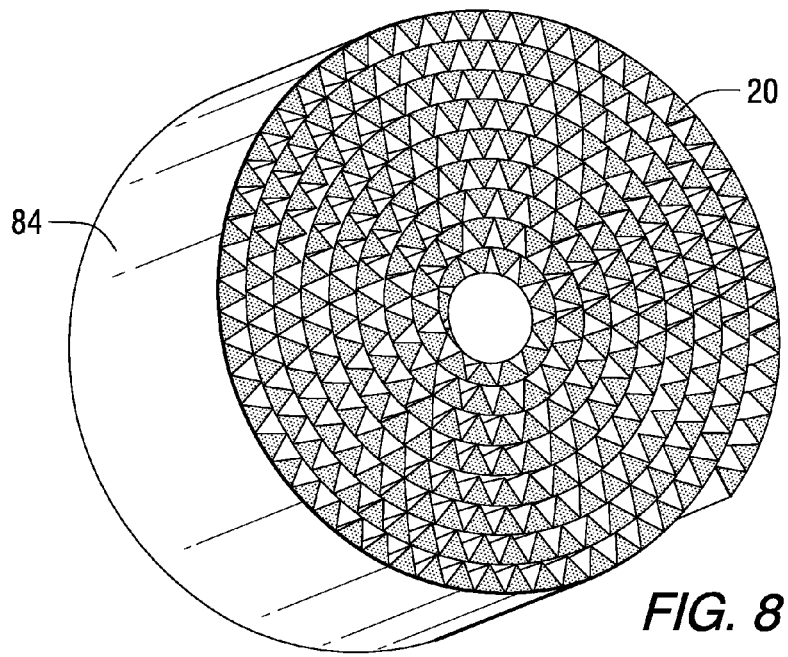
FIG. 8 is a perspective view showing one implementation of a pleated filter element in accordance with the disclosure.
Figure 9:
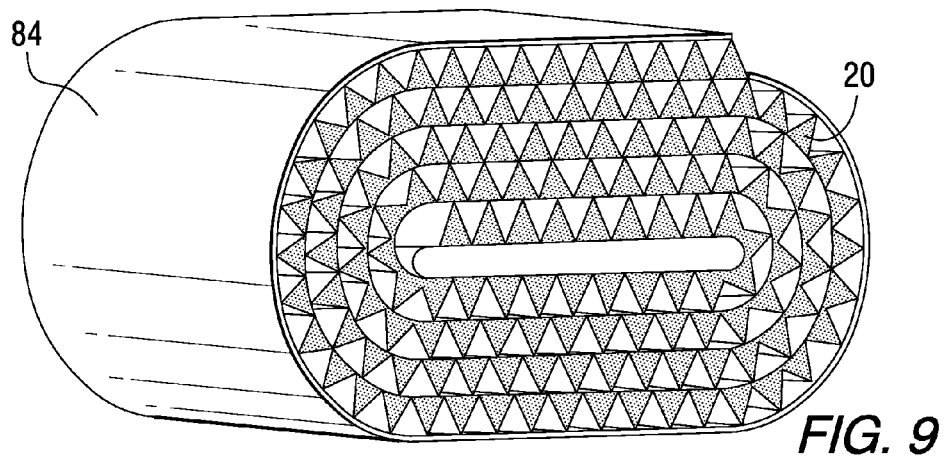
FIG. 9 is a perspective view showing another implementation of a pleated filter element in accordance with the disclosure.
Figure 10:
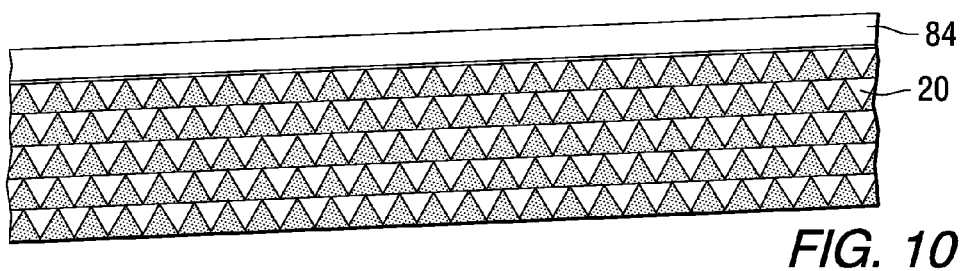
FIG. 10 is an end view showing another implementation of a pleated filter element in accordance with the disclosure.
Figure 11:
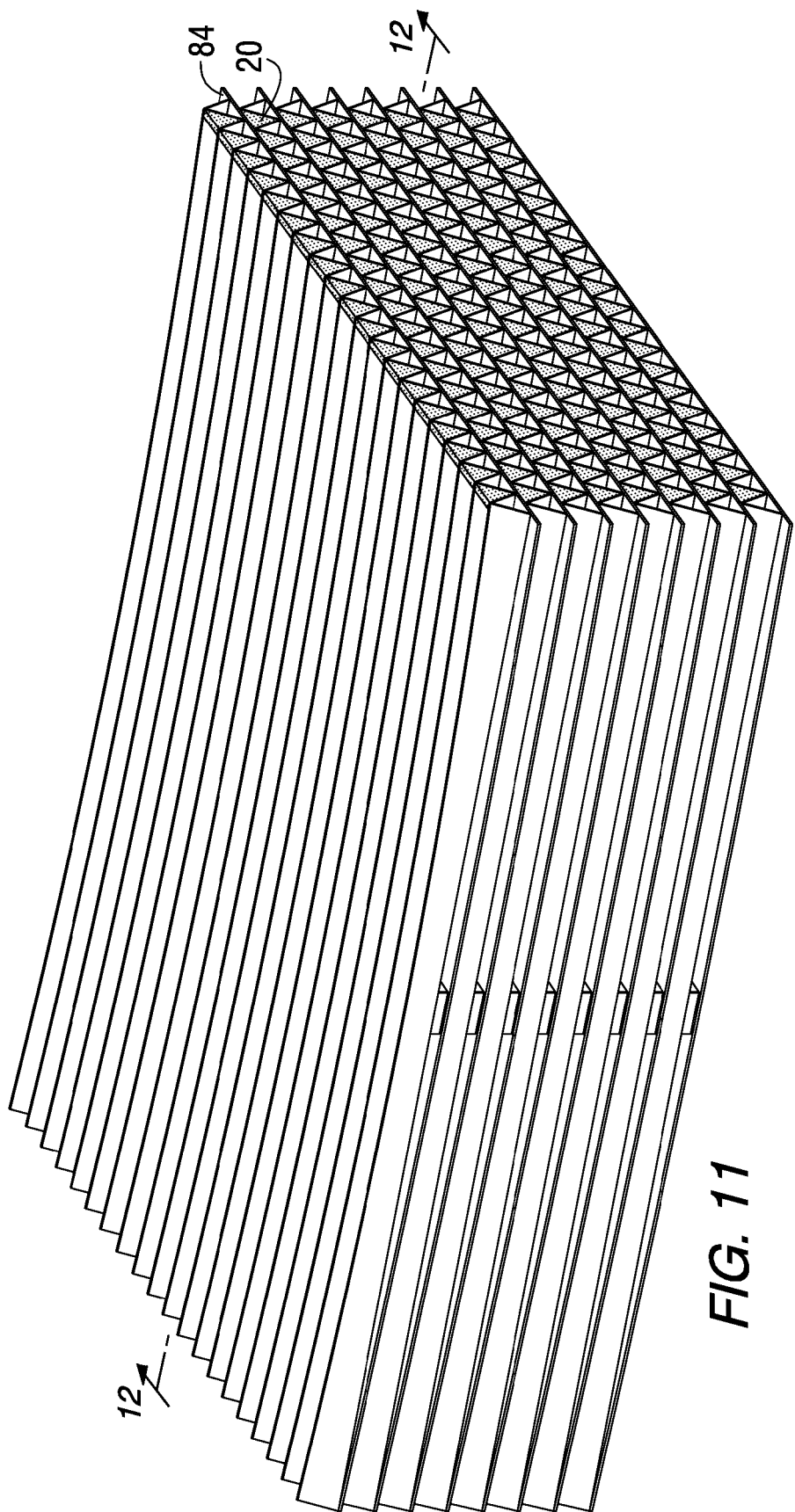
FIG. 11 is a perspective view further showing the implementation of FIG. 10.
Figure 12:
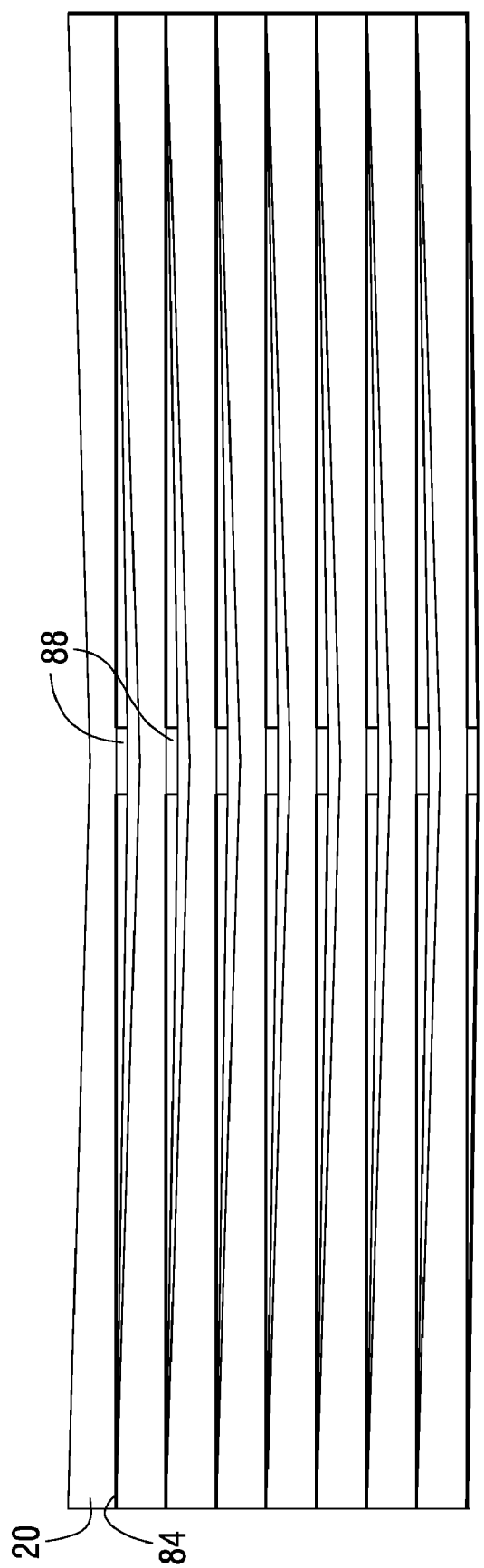
FIG. 12 is a sectional view taken along line 12-12 of FIG. 11.

The filter element is further provided with a substantially flat sheet 84 extending laterally across the bend lines. In one embodiment, the sheet is formed of filter media material, which may be the same filter media material as the pleated filter element including wall segments 34. Sheet 84 extends axially along the full axial length along axial direction 28 between upstream inlet 22 and downstream outlet 24, and extends laterally along the full lateral width along lateral direction 44 across and sealing the channels to prevent bypass of dirty upstream air to clean downstream air without passing through and being filtered by a wall segment 34. In one embodiment, sheet 84 is rectiplanar along a plane defined by axial direction 28 and lateral direction 44. In another embodiment, sheet 84 is slightly corrugated, as shown in dashed line at 86, FIG. 5. In one implementation, sheet 84 is rolled with the filter element into a closed loop, and in various embodiments the closed loop has a shape selected from the group of circular, FIG. 8, racetrack, FIG. 9, oval, oblong, and other closed-loop shapes. In other embodiments, a plurality of pleated filter elements and sheets are stacked upon each other in a stacked panel arrangement, FIGS. 10-12. Spacer strips or embossments such as 88 may be used as needed for spacing and support between stacked elements.

Figure 13:
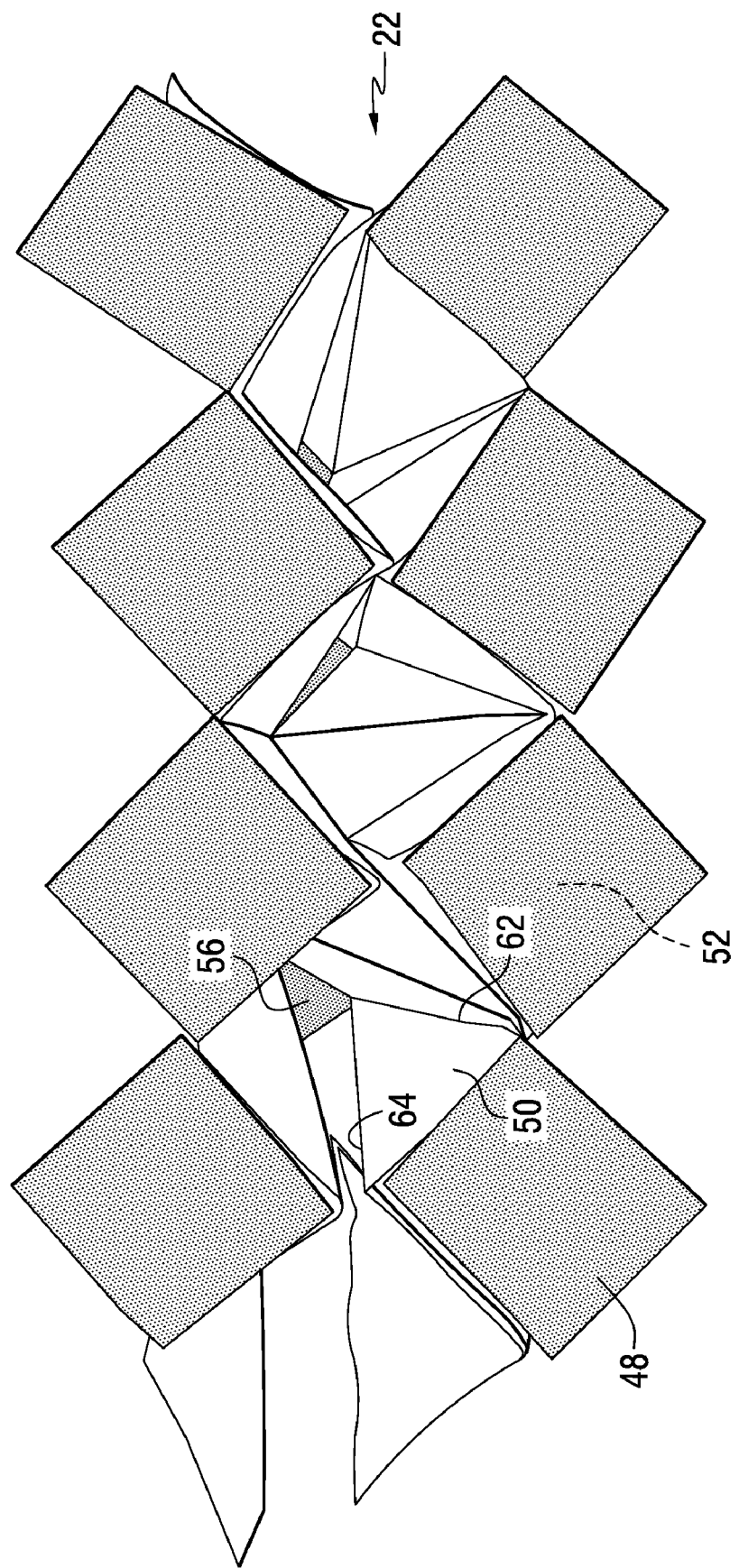
FIG. 13 is like FIGS. 5 and 6 and shows another embodiment.
Figure 14:
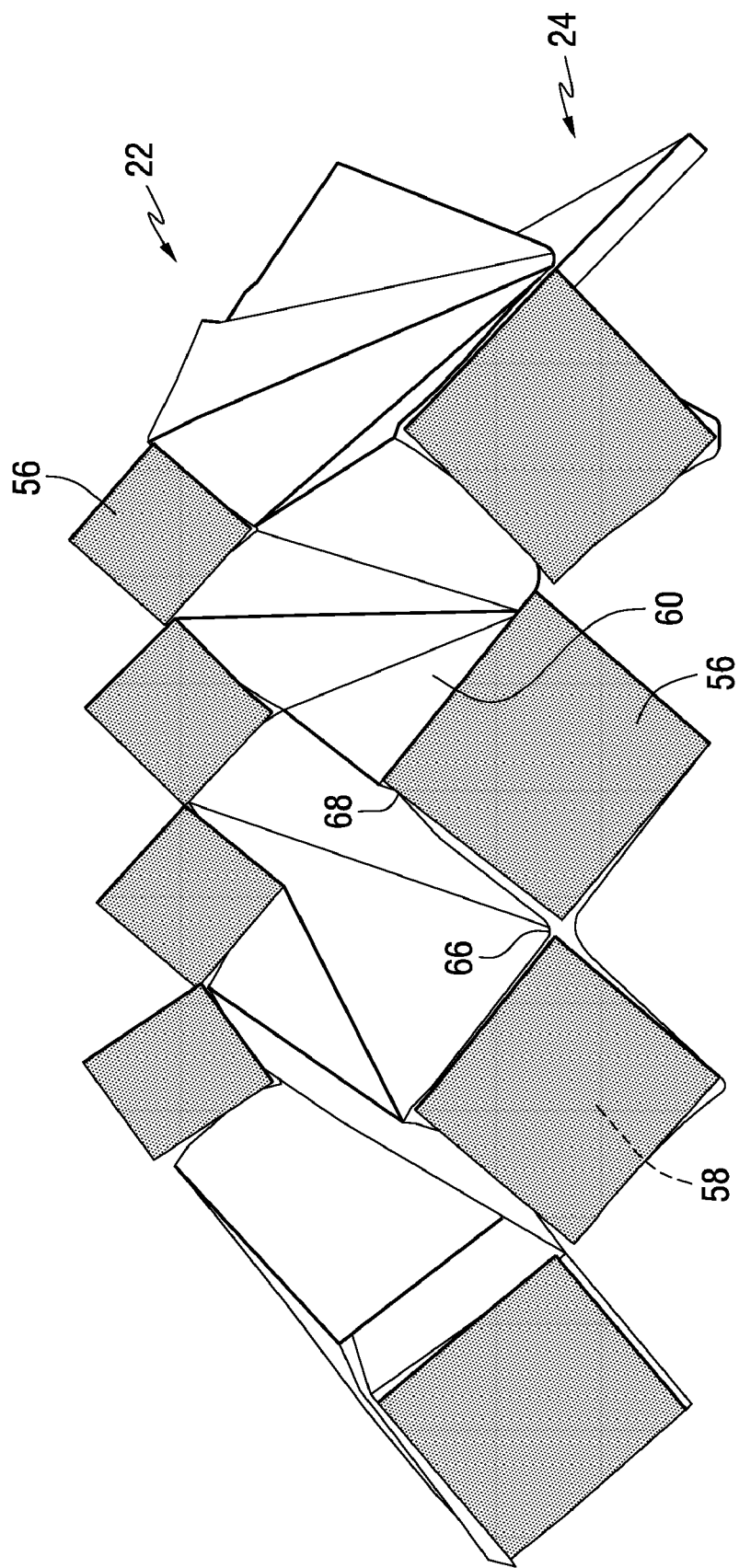
FIG. 14 is like FIG. 7 and is a view from the opposite end of FIG. 13.
Figure 15:
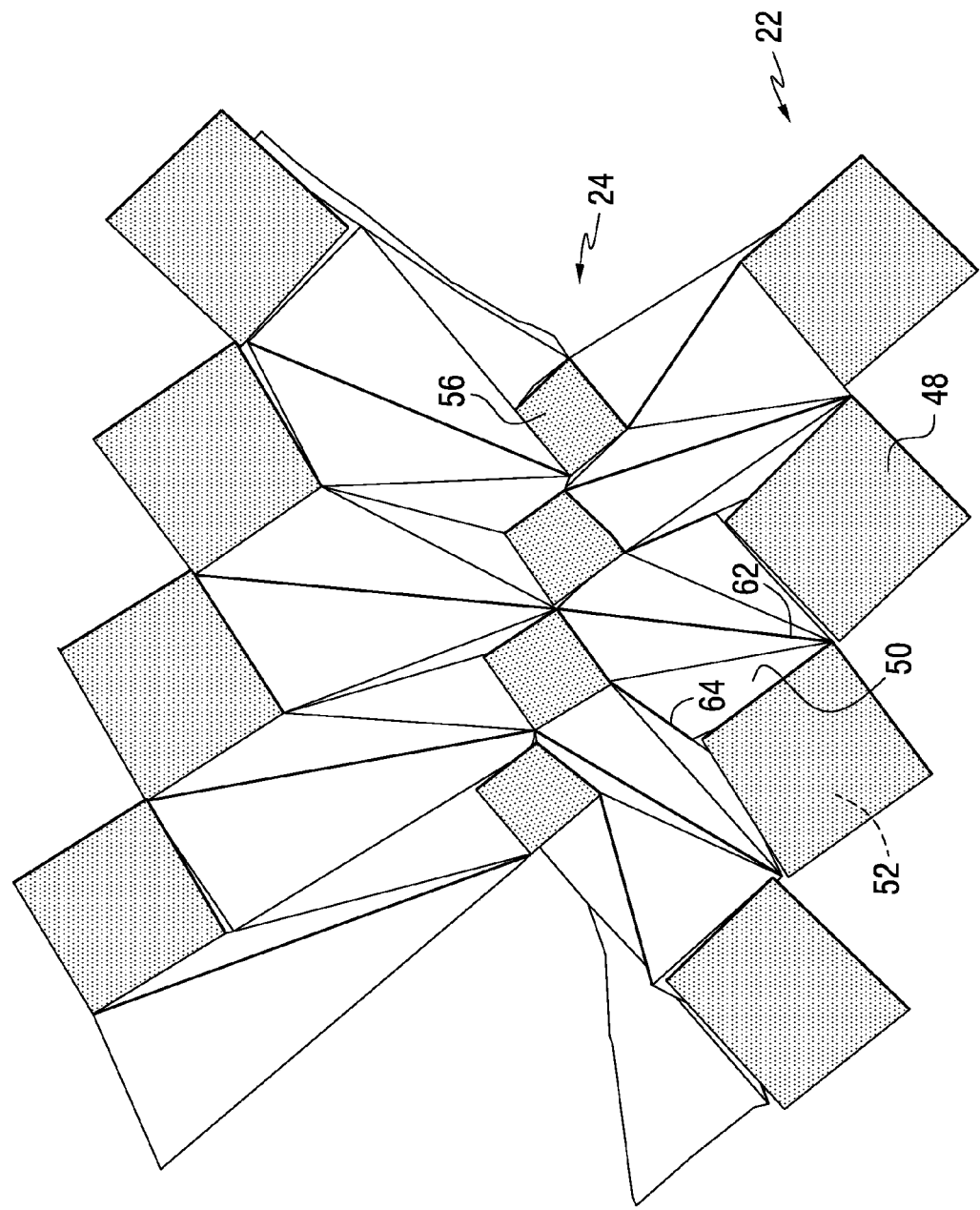
FIG. 15 is like FIG. 5 and further shows the construction of FIG. 13.

FIGS. 13-15 show a further embodiment eliminating sheet 84 and are like FIGS. 5-7 and use like reference numerals from above where appropriate to facilitate understanding. The filter element of FIGS. 13-15 has an upstream inlet 22 receiving incoming dirty fluid, and a downstream outlet 24 discharging clean filtered fluid. The wall segments are alternately sealed to each other at upstream inlet 22 as above, e.g. by adhesive or a section of filter media at 48, to define the noted first set of channels 50 having open upstream ends, and the noted second set of channels 52 interdigitated with the first set of channels and having closed upstream ends. The wall segments are alternately sealed to each other at downstream outlet 24, e.g. by adhesive or a section of filter media at 56, to define the noted third set of channels 58 having closed downstream ends, and the noted fourth set of channels 60 having open downstream ends. The bend lines include the noted first subset of bend lines 62 defining the first set of channels 50, and the noted second subset of bend lines 64 defining the noted second set of channels 52, and the noted third subset of bend lines 66 defining the third set of channels 58, and the noted fourth subset of bend lines 68 defining the noted fourth set of channels 60.

The elongated tetrahedron channels allow for cross-flow between adjacent channels. In air filter implementations, this cross-flow allows for more even dust loading on the upstream side of the media. In one embodiment, the elongated tetrahedron channels are shaped to purposely allow for more upstream void volume than downstream void volume, to increase filter capacity. Various fluids may be filtered, including air or other gases, and including liquids.

In the foregoing description, certain terms have been used for brevity, clearness, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims. Each limitation in the appended claims is intended to invoke interpretation under 35 U.S.C. §112, sixth paragraph, only if the terms "means for" or "step for" are explicitly recited in the respective limitation.

What is claimed is:

1. A filter element having an upstream inlet and a downstream outlet and pleated along a plurality of bend lines, said bend lines extending axially along an axial direction and comprising a first set of bend lines extending from said upstream inlet axially towards said downstream outlet, and a second set of bend lines extending from said downstream outlet axially towards said upstream inlet, said filter element having a plurality of wall segments extending in serpentine manner between said bend lines, said wall segments extending axially and defining axial channels therebetween, said channels having a height along a transverse direction, said transverse direction being perpendicular to said axial direction, said channels having a lateral width along a lateral direction, said lateral direction being perpendicular to said axial direction and perpendicular to said transverse direction, at least some of said bend lines tapering in said transverse direction as they extend axially in said axial direction, wherein said wall segments extending in said serpentine manner define a laterally extending serpentine span comprising a first said wall segment laterally adjacent a second said wall segment and joined thereto by a first said bend line and continuing in said serpentine manner along said serpentine span to a third said wall segment laterally adjacent said second wall segment and joined thereto by a second said bend line, and so on along said serpentine span, wherein said serpentine span extends along said lateral direction, such that the taper of said bend lines tapering in said transverse direction is perpendicular to said serpentine span along said lateral direction, wherein said wall segments comprise a first set of wall segments alternately sealed to each other at said upstream inlet to define a first set of channels having open upstream ends, and a second set of channels interdigitated with said first set of channels and having closed upstream ends, said wall segments comprise a second set of wall segments alternately sealed to each other at said downstream outlet to define a third set of channels having closed downstream ends, and a fourth set of channels interdigitated with said third set of channels and having open downstream ends, said first set of bend lines comprising a first subset of bend lines defining said first set of channels, and a second subset of bend lines defining said second set of channels, said second subset of bend lines tapering in said transverse direction as they extend from said upstream inlet axially towards said downstream outlet, said second set of bend lines comprising a third subset of bend lines defining said third set of channels, and a fourth subset of bend lines defining said fourth set of channels, said fourth subset of bend lines tapering in said transverse direction as they extend from said downstream outlet axially towards said upstream inlet.

2. The filter element according to claim 1 wherein:
said second set of channels have a decreasing transverse channel height along said transverse direction as said second set of channels extend axially towards said downstream outlet;
said tapering of said second subset of bend lines in said transverse direction provides said decreasing transverse channel height of said second set of channels;
said fourth set of channels have a decreasing transverse channel height along said transverse direction as said fourth set of channels extend axially towards said upstream inlet;
said tapering of said fourth subset of bend lines in said transverse direction provides said decreasing transverse channel height of said fourth set of channels.

3. The filter element according to claim 2 wherein said second subset of bend lines provides lateral cross-flow thereacross along said lateral direction between respective channels downstream of said upstream inlet.

4. The filter element according to claim 2 wherein said fourth subset of bend lines provides lateral cross-flow thereacross along said lateral direction between respective channels upstream of said downstream outlet.

5. The filter element according to claim 2 wherein said second and fourth subsets of bend lines provide lateral cross-flow thereacross along said lateral direction between respective channels downstream of said upstream inlet and upstream of said downstream outlet.

6. The filter element according to claim 5 wherein said second and fourth subsets of bend lines have axially overlapping sections, and wherein said lateral cross-flow is provided at least at said axially overlapping sections.

7. The filter element according to claim 2 wherein:
said second subset of bend lines taper to respective termination points providing minimum transverse channel height of said second set of channels;
said fourth subset of bend lines taper to respective termination points providing minimum transverse channel height of said fourth set of channels;
said termination points of said second subset of bend lines are axially downstream of said termination points of said fourth subset of bend lines.

8. The filter element according to claim 7 wherein:
said termination points of said second subset of bend lines are at or axially upstream of said downstream outlet;
said termination points of said fourth subset of bend lines are at or axially downstream of said upstream inlet.

9. A filter element having an upstream inlet and a downstream outlet and pleated along a plurality of bend lines, said bend lines extending axially along an axial direction and comprising a first set of bend lines extending from said upstream inlet axially towards said downstream outlet, and a second set of bend lines extending from said downstream outlet axially towards said upstream inlet, said filter element having a plurality of wall segments extending in serpentine manner between said bend lines, said wall segments extending axially and defining axial channels therebetween, said channels having a height along a transverse direction, said transverse direction being perpendicular to said axial direction, said channels having a lateral width along a lateral direction, said lateral direction being perpendicular to said axial direction and perpendicular to said transverse direction, at least some of said bend lines tapering in said transverse direction as they extend axially in said axial direction, said wall segments comprising a first set of wall segments alternately sealed to each other at said upstream inlet to define a first set of tetrahedron channels having open upstream ends, and a second set of tetrahedron channels interdigitated with said first set of tetrahedron channels and having closed upstream ends, said wall segments comprising a second set of wall segments alternately sealed to each other at said downstream outlet to define a third set of tetrahedron channels having closed downstream ends, and a fourth set of tetrahedron channels interdigitated with said third set of tetrahedron channels and having open downstream ends, said first set of bend lines comprising a first subset of bend lines defining said first set of tetrahedron channels, and a second subset of bend lines defining said second set of tetrahedron channels, said second subset of bend lines tapering in said transverse direction as they extend from said upstream inlet axially towards said downstream outlet, said second set of bend lines comprising a third subset of bend lines defining said third set of tetrahedron channels, and a fourth subset of bend lines defining said fourth set of tetrahedron channels, said fourth subset of bend lines tapering in said transverse direction as they extend from said downstream outlet axially towards said upstream inlet, wherein said wall segments extending in said serpentine manner define a laterally extending serpentine span comprising a first said wall segment laterally adjacent a second said wall segment and joined thereto by a first said bend line and continuing in said serpentine manner along said serpentine span to a third said wall segment laterally adjacent said second wall segment and joined thereto by a second said bend line, and so on along said serpentine span, wherein said serpentine span extends along said lateral direction, such that the taper of said bend lines tapering in said transverse direction is perpendicular to said serpentine span along said lateral direction.

10. The filter element according to claim 9 wherein said first and second sets of tetrahedrons channels face oppositely to said third and fourth sets of tetrahedron channels.

11. The filter element according to claim 10 wherein each of said tetrahedron channels is elongated in said axial direction.

12. The filter element according to claim 11 wherein each of said tetrahedron channels has a cross-sectional area along a cross-sectional plane defined by said transverse and lateral directions, and wherein:
- the cross-sectional areas of said first and second sets of tetrahedron channels decrease as said first and second sets of tetrahedron channels extend along said axial direction from said upstream inlet toward said downstream outlet;
- the cross-sectional areas of said third and fourth sets of tetrahedron channels decrease as said third and fourth sets of tetrahedron channels extend along said axial direction from said downstream outlet toward said upstream inlet.

13. The filter element according to claim 9 wherein said bend lines are bent at a sharp pointed angle.

14. The filter element according to claim 9 wherein said bend lines are rounded along a given radius.

15. The filter element according to claim 9 further comprising a substantially flat sheet extending laterally across said bend lines.

16. The filter element according to claim 15 wherein said sheet is composed of filter material.

17. The filter element according to claim 16 wherein said wall segments and said sheet are composed of the same filter material.

18. The filter element according to claim 15 wherein said sheet extends axially along the full axial length between said upstream inlet and said downstream outlet.

19. The filter element according to claim 18 wherein said sheet is rectiplanar.

20. The filter element according to claim 18 wherein said sheet is slightly corrugated.

21. The filter element according to claim 15 wherein said sheet is rolled with said filter element into a closed loop.

22. The filter element according to claim 21 wherein said closed loop has a shape selected from the group consisting of circular, racetrack, oval, oblong.

23. The filter element according to claim 15 comprising a plurality of said pleated filter elements and sheets stacked upon each other in a stacked panel arrangement.

* * * * *